Nov. 11, 1952

H. E. HESSLER 2,617,544

LUMBER STACKER

Filed April 14, 1950

INVENTOR.
*Herbert E. Hessler*
BY
*Buckhorn and Cheatham*

Attorneys

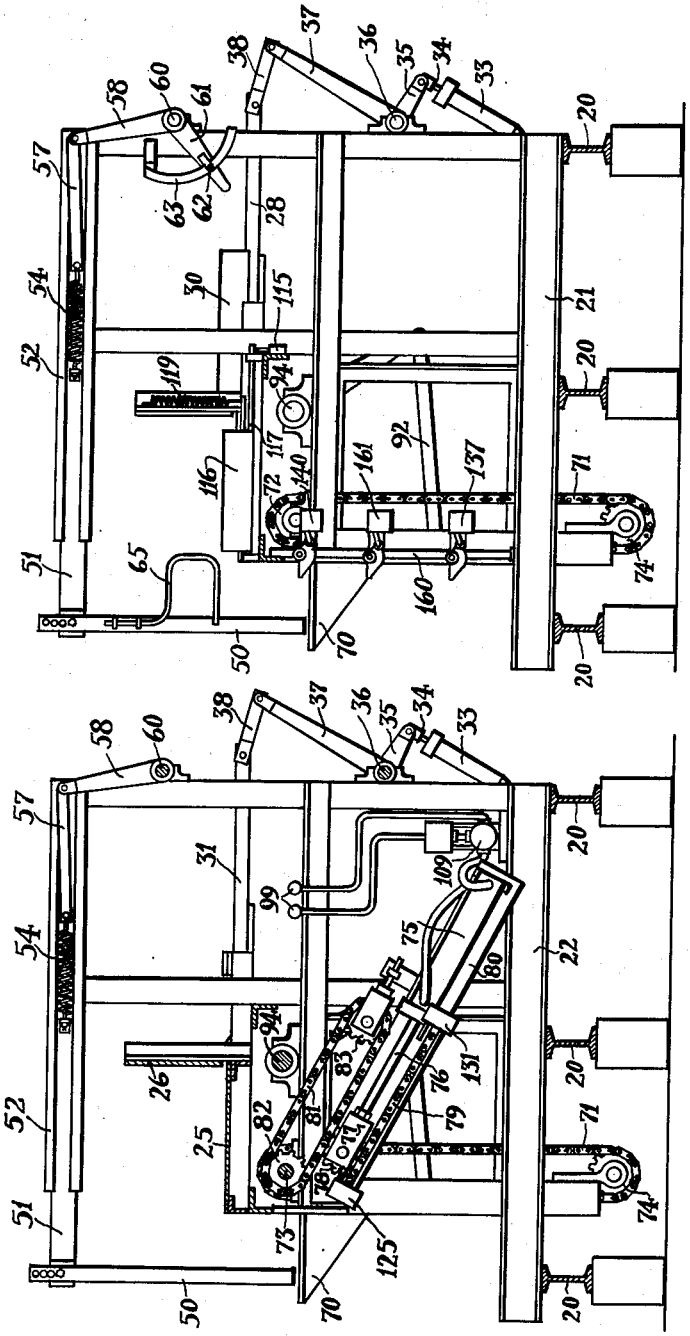

Nov. 11, 1952     H. E. HESSLER     2,617,544
LUMBER STACKER

Filed April 14, 1950     3 Sheets-Sheet 3

INVENTOR.
Herbert E. Hessler
BY Buckhorn and Cheatham
Attorneys

Patented Nov. 11, 1952

2,617,544

UNITED STATES PATENT OFFICE 2,617,544

LUMBER STACKER

Herbert E. Hessler, Portland, Oreg.

Application April 14, 1950, Serial No. 155,813

16 Claims. (Cl. 214—6)

My present invention comprises a machine for stacking lumber and forming packages of a plurality of the formed stacks. The invention is of particular utility in a sawmill where a large quantity of lumber of the same size is created and it is desired to create packages of the lumber either for air drying or for insertion into drying kilns or for shipment directly from the mill. The principal object of the present invention is to provide means whereby lumber of any size may be assembled into packages of any size without the necessity for manual labor, thus decreasing the cost of producing commercial lumber.

A further object of the present invention is to provide a machine of the foregoing character which is extremely simple and rugged and which may be rapidly adjusted to accommodate different sizes of lumber or to create different sizes of stacks and packages.

A further object of the present invention is to provide means whereby irregularities in the various pieces of lumber may be handled without jamming the mechanism.

These and other objects and advantages of the present invention will be more readily ascertained by inspection of the following specification together with the accompanying drawing wherein like numerals refer to like parts throughout, while the features of novelty will be more distinctly pointed out in the appended claims.

In the drawing, Fig. 1 is a front elevation of a machine embodying the present invention;

Fig. 3 is a vertical section taken substantially along line 3—3 of Fig. 1;

Fig. 4 is a vertical section taken substantially along line 4—4 of Fig. 1;

Figures 8, 9:
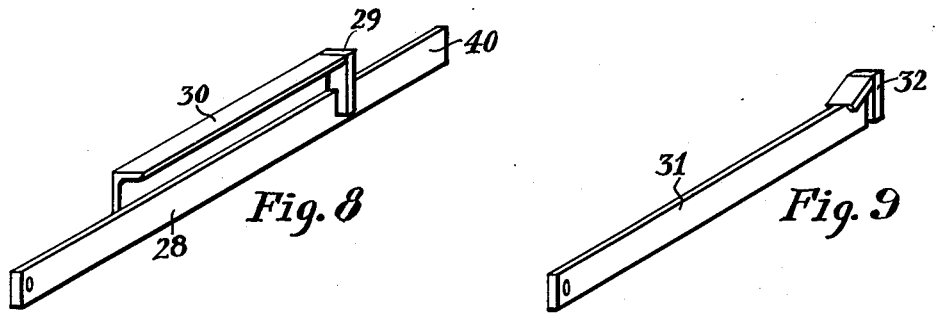
Fig. 8 is a view of an upper pusher member.
Fig. 9 is a similar view of one of a plurality of other upper pusher members.

The machine as illustrated herein comprises a plurality of longitudinal frame members 20 suitably mounted upon concrete piers or the like and which support cross-frame members such as indicated at 21, 22, 23 and 24. Each of the cross-frame members defines a station at which suitable uprights are located to support upper frame members whereby a tablelike structure is created. Details of the frame members are not important to the present invention and it would be confusing and unnecessary to describe each. A portion of the frame supports a deck 25 extending the entire length of the machine along one side of which is positioned an upright guide plate 26. Feeding means exemplified by the last driven feed roll 27 may be associated with the machine in such position as to longitudinally move individual pieces of lumber onto the deck 25 against the guide plate 26. At each of the stations represented by the cross-frame members 21 to 24 inclusive there is provided an arm of an upper pusher. The arm next adjacent the feed roll 27 is illustrated in Fig. 8 and comprises an elongated bar 28 suitably guided for movement transversely of the machine, the bar 28 supporting an upright 29 projecting through a slot in the deck and movable through a notch in the lower edge of the guide plate 26. Behind the upper edge of the upright 29 there is provided an angle bar 30 extending parallel to the bar 28 for a considerable distance, thereby providing a raised ledge which projects above the surface of the deck when the arm is outwardly extended. The forward end of the bar 28 is at the level of the deck so that when the bar 28 is retracted to the extent that upright 29 is behind the guide 26 the end of a piece of lumber which has been deposited in the machine may drop onto and depress a switch actuator, as will appear later. At each of the succeeding stations of the machine above the cross-frame members 22, 23, 24 there are provided shorter upper pusher bars 31 which are of the same length as the length of bar 28 to the upright 29. Each of the bars 31 carries a small upright 32 at its outer end which projects above the surface of the deck and moves through a slot in the guide 26 so that an edge of a piece of lumber may be simultaneously engaged by the uprights 29 and 32 as the bars 28 and 31 are simultaneously projected beyond the guide 26. In order to accomplish this movement a cylinder 33 is mounted on the frame of the machine and a piston 34 extending therefrom is connected to a crank 35 fixed to a rock shaft 36 extending longitudinally of the machine. A plurality of levers 37 are fixed to shaft 36 and have their outer ends connected through links 38 to the rear ends of bars 31 and 28. Thus, when the piston 34 is extended, all of the upper pusher members are projected forwardly to an equal extent to move a piece of lumber laterally from the deck 25. The portion 40 of bar 28 beyond the upright 29 is of such length as to project a substantial distance beyond the outer edge of the deck when the upper pusher is fully extended. Therefore, the end of a piece of lumber next adjacent the feeding mechanism is supported while the far end of the piece of lumber may drop until arrested by other mechanism as will appear. This is purposely done since if the entire length of the piece were permitted to drop at once it might become canted or otherwise displaced from its proper position in the stack.

Figures 5, 6, 7:
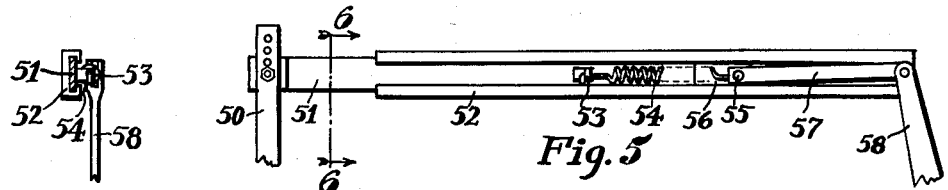
Fig. 5 is an enlarged detail view of a portion of a pusher mechanism employed in the machine, showing the mechanism in its normal position.
Fig. 6 is a vertical section taken substantially along line 6—6 of Fig. 5.
Fig. 7 is a view similar to Fig. 5 showing the mechanism extended in order to accommodate a warped piece of lumber or one which may have become misplaced in the stacking mechanism.

In order to prevent the lumber from being thrown from the machine in spite of the rapidity of motion of the upper pusher, outer guide means are provided at each of the transverse stations. The outer guide means at each station comprises an upright bar 50 adjustable vertically of the end of an elevated, transverse bar 51 which is longitudinally slidable in a guiding channel 52 mounted on the frame. The bar 51 is provided with a lug 53 near its inner end to which is connected one end of a tension spring 54 having its other end connected to a pin 55 projecting from a second bar 56 longitudinally aligned with bar 51 and slidably guided in the inner extremity of the guide 52, the spring 54 thereby normally holding the adjacent ends of the bars 51 and 56 in abutted relation. If a board should become canted, or should be warped beyond tolerances, the upright guide 50 will not be broken or bent since the spring 54 will permit the ends of the bars 51 and 56 to separate, as indicated in Fig. 7. The pin 55 is connected to a link 57 extending to a crank 58 fixed to a shaft 60 extending longitudinally of the machine and affixed to the other cranks 58 at the other stations of the machine so that all of the uprights 50 may be positioned with respect to the edge of the deck simultaneously in order to accommodate lumber of different widths. One end of the shaft is fixed to an adjusting lever 61 which carries a locking pin 62 or the like cooperating with an arcuate adjusting scale 63 in any convenient manner whereby the operator may instantaneously adjust the machine for different widths of lumber. Preferably the upright 50 adjacent the feeder end of the machine supports a resilient hold-down bar 65 which is adjustable vertically of the upright 50 by any suitable means and which is bent laterally, then downwardly and outwardly, so as to provide a resilient hold-down overlying the bar extension 40 when the upper pusher is extended so that when the first end of the piece of lumber drops onto the stack the immediate end will not bounce out of position.

At each station of the machine there is provided an elevator bracket 70 which is slidably guided for vertical movement in a vertical portion of the frame and which is connected to a sprocket chain 71 extending about an upper sprocket 72, connected to a longitudinally extending shaft 73, and about a vertically adjustable lower sprocket 74 mounted on a suitable portion of the frame. Shaft 73 is rotated to move all of the elevator members 70 in unison by mechanism conveniently located above the station represented by the cross-member 22. This means comprises a cylinder 75 mounted in an inclined position and from which a piston rod 76 projects to a crosshead 77. The crosshead carries a rotatably mounted sprocket 78, the lower teeth of which are engaged with a stationary sprocket chain 79 suitably fixed in a frame 80 on which the cylinder is supported. The upper teeth of the sprocket 78 engage an endless sprocket chain 81 passing about a sprocket 82 fixed to shaft 73 and an idler sprocket 83 adjustably mounted on the frame 80. When the piston is extended the shaft 73 is rotated clockwise in Fig. 4 to elevate the members 70, and when the piston is retracted the elevator members are lowered.

The stack pushing mechanism comprises a plurality of upright stack pushers 90 forming the front edges of stack pusher frames including upper horizontal members 91 positioned at a distance below the deck 25 and slightly below the horizontal surfaces of the elevator members 70 when fully elevated. When the stack pushers are fully retracted lumber drops onto the elevator, but when extended and the elevator is lowered the first piece of lumber, or perhaps the first two or three pieces, depending upon the speed of feeding to the machine, will rest upon the members 91, being prevented from outward movement by frictional engagement with members 91 by the outer guides 50. When the elevator is fully elevated these succeeding pieces will be supported by the elevator and the stack pushers may be retracted to their initial position. In order to operate the stack pushers, each is connected by a link 92 to a crank 93 fixed to a shaft 94 running longitudinally of the machine. Shaft 94 is connected to a crank 95 pivotally attached to the outer end of a piston 96 extending from a cylinder 97 so that all of the pushers operate simultaneously to move a completed stack laterally.

In the preferred embodiment of the machine fluid is supplied to the pistons from any suitable source of fluid under pressure through main supply and return lines 99 running longitudinally of the machine and having branches connected to control valves, these including valve 107 which controls the upper pusher cylinder 33, valve 108 which controls the stack pusher cylinder 97, and valve 109 which controls the elevator cylinder 75. The valves are each four-way valves, the valve 107 being of the type which remains at either extreme position until moved therefrom, and the valves 108 and 109 being of the spring-centered type which returns to neutral unless held at either extreme position. Each of the cylinders is of the positive acting, two-way type whereby fluid admitted at one end forces fluid from the other end through the four-way valve, and vice versa. Thus each of the operating mechanisms is positively moved in one direction or the other. Control of the valves is achieved through solenoids, as will appear, and control of the solenoids is achieved through a control circuit operated by the lumber being stacked, as will appear.

Figure 10:
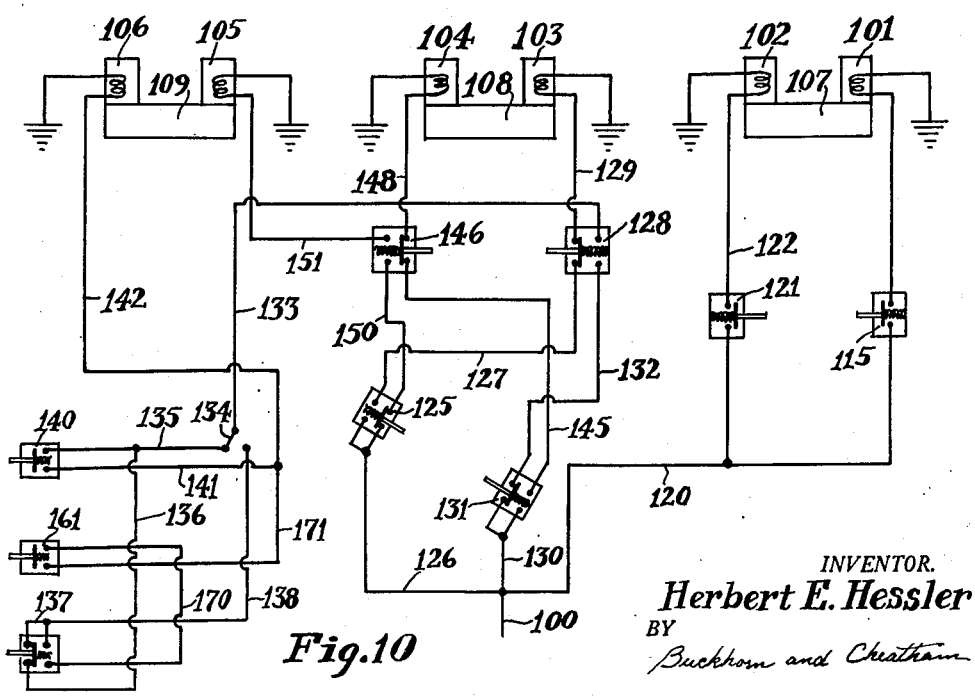
Fig. 10 is a schematic diagram of the control circuit embodied in the machine.

In Fig. 10 there is illustrated a schematic control circuit for the machine. The electrical portion of the control circuit comprises a main line 100 which leads current to a plurality of switches for operating a plurality of self-returned solenoids 101 to 106 inclusive, the opposite ends of which are grounded so that whenever a circuit is completed to one of the solenoids it will move from inoperative to operative position and will be held in operative position until the circuit to it is broken. The solenoids 101 and 102 operate the four-way valve 107 of the type which remains in the position to which it is moved upon energization of either one of its controlling solenoids. This valve controls the direction of movement of the cylinder 33 connected to the upper pusher which removes single boards from the stationary deck. Solenoids 103 and 104 control the four-way valve 108 of the type which moves in either direction depending upon the energization of one or the other of its controlling solenoids, but which is spring-returned to a neutral position immediately upon deenergization of the solenoid. Valve 108 controls the operation of the cylinder 97 connected to the stack pusher which removes a completed stack from the elevator. Solenoids 105 and 106 control the similar spring-centered four-way valve 109 which controls the operation of the cylinder 75 connected to the elevator.

Figure 1:
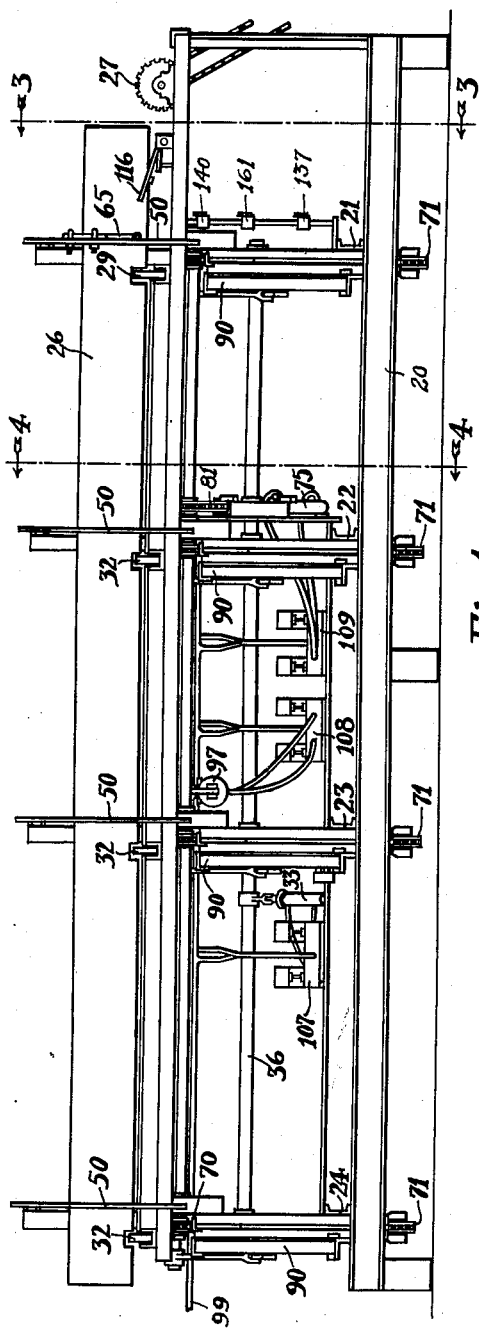
Figure 2:
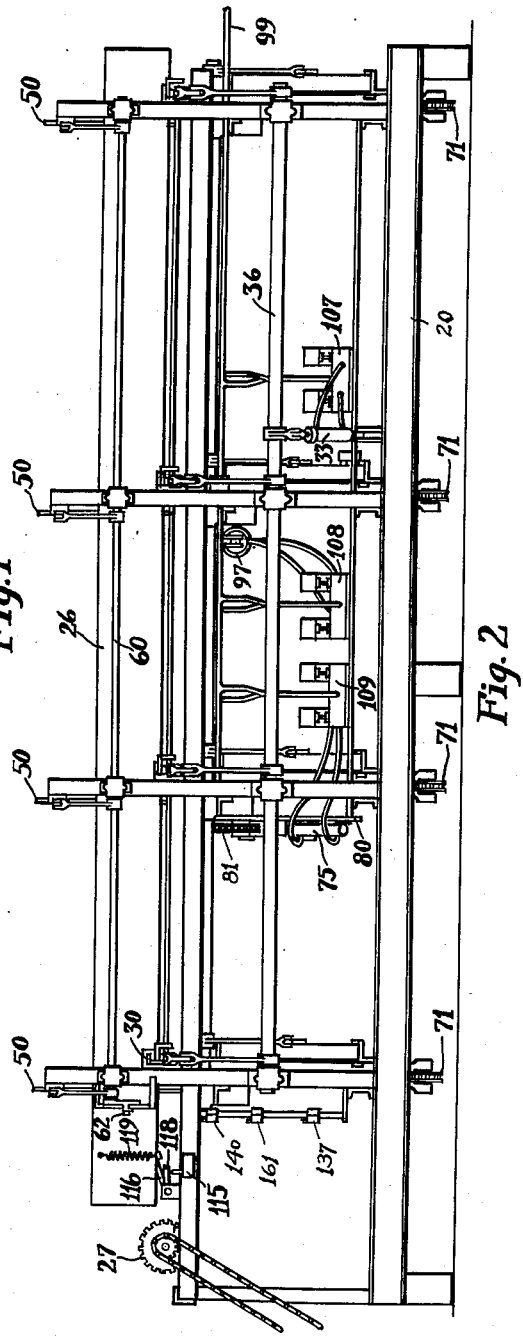
Fig. 2 is a rear elevation of the machine.

Solenoid 101 will be energized when a spring-opened, push-button switch 115 (Fig. 3) is closed by a flapper 116 pivotally mounted at one end of the deck adjacent the last feed-in roll (Figs. 2 and 3). The flapper is fixed to a rocker shaft 117 which is journaled transversely of the machine and has a switch plunger operating lever 118 affixed thereto in position to engage the plunger of switch 115 so that when the end of a board which has been fed onto the deck drops off of the last feed-in roll 27 the switch will be closed and will remain closed until the board is moved transversely from the deck, whereupon a spring 119 tensioned between the flapper and a stationary portion of the machine opens the switch. Due to the closing of the switch, current flows from main line 100 through a branch 120 and switch 115 to energize solenoid 101, thereby causing valve 107 to move to the position in which the upper pusher is caused to move the board transversely onto the elevator. The valve will remain in this position regardless of the opening of switch 115 until the crank arm of the pusher engages the plunger of a switch 121 mounted on the frame of the machine and adapted to close a branch 122 line leading to the solenoid 102. Since the valve 107 will no longer be held at one extreme because the switch 115 by this time will have opened due to the lateral removal of the board, energization of solenoid 102 will now throw the valve 107 to its opposite extreme, thus causing the upper pusher to be moved to the rear. Valve 107 will remain in this position and the piston controlled thereby will continuously urge the upper pusher to remain at its rear position until the next operation of switch 115 by a succeeding board.

It is to be appreciated that the first board to be pushed onto the elevator will be deposited thereon by having one end drop thereon, but its other end will not be released from the single extension 40 of the upper pusher until the pusher is fully retracted, thus assuring the creation of an aligned stack. The elevator will stop at the position illustrated in Figs. 3 and 4, at which time crosshead 77 connected to the piston 75 for operating the elevator will be at its outermost position, engaging the plunger of a switch 125 (Fig. 4) and causing that plunger to move to its inner circuit-closing position against the resistance of a contained spring. In this position the switch bridges a gap between a branch 126 from the main line and a wire 127 leading to an outer contact of a two-position, spring-urged switch 128 which at this time is in its outer position, thereby completing a circuit through wire 129 to energize solenoid 103. Energization of solenoid 103 moves the spring-centered valve 108 in the direction to cause the stack pusher 90 to be retracted. It will be seen from the foregoing that a board which was first held up at one end by the extension of the upper pusher and then dropped onto the stack pusher frame, will now be supported by the elevator, it being impossible for the stack pusher to be retracted until the elevator reaches its upper position to depress the plunger of switch 125. When the elevator starts to move downward the switch 125 will naturally open, thus breaking the circuit to the solenoid 103 and permitting this valve to return to neutral setting for subsequent control actions to occur.

When the elevator is in its upper position a circuit is completed from branch 130 of the main line through a switch 131 (Fig. 4) under control of the elevator piston crosshead 77 and which may be moved to its inner position against the compression of contained spring when the elevator is fully lowered. Since the piston rod is extended now, the switch 131 will be in its outer position bridging the gap between wire 130 and a wire 132 leading to the inner position of switch 128 which is now closed due to the complete retraction of the stack pusher. Therefore, current may flow to a wire 133 leading to a manual switch 134, which for the purpose of the immediate explanation is positioned to contact the terminal of a wire 135. Wire 135 leads to a branch 136 connected to an outer terminal of a two-position, spring-urged switch 137 (Fig. 3), the opposite terminal of which is connected to a wire 138 leading back to the opposite contact of the manual switch 134. The switch 137 is in position to be operated by the lower board of a completed stack when the elevator has dropped sufficiently, but no current may flow through wire 138 because of the position of manual switch 134. Wire 135 also leads to one contact of a single-position, spring-opened switch 140 (Fig. 3) which is located at the top of the elevator mechanism so as to be closed by the first board to drop onto the elevator. Note that if this board is dropped onto the stack pusher so as to close switch 140 prior to the elevation of the elevator nothing can happen since switch 128 is at its outer position and switch 140 is dead. Switch 140 can only be effective when switch 131 is at its outer position and switch 128 at its inner position. The other terminal of switch 140 is connected to a wire 141 which branches from a wire 142 leading to solenoid 106. The valve 109 may therefore be thrown in the direction to lower the elevator when the elevator is fully elevated and the stack pusher fully retracted, which will continue until the board clears the actuator of switch 140. Lowering of the elevator will continue step by step as often as a board is deposited on the elevator by the upper pusher. This will continue until the elevator piston is fully retracted and moves the operator of switch 131 to its inner position, at which time the circuit to switch 140 will be broken. Simultaneously with the breaking of the circuit to switch 140, switch 131 will complete a circuit from wire 130 through wire 145 to a terminal of an outer position of a plunger-operated, spring-returned switch 146. This switch is in its outer position at the present time since the stack pusher is fully retracted and the switch-operating lug 147 thereon is holding switch 128 at its inner position. Therefore, a circuit is completed from wire 145 to wire 148 leading to solenoid 104, the valve 108 being thereby moved from neutral to the position at which the stack pusher is caused to move outward to move the completed stack. As soon as the stack pusher reaches its outer limit the operating lug 147 thereon will move the switch 146 toward its inner position, thus momentarily breaking the circuit to solenoid 104 and permitting the valve to return to neutral to arrest the stack pusher at this position. The stack pusher will therefore remain at its outer position until the elevator is fully elevated again, as will appear. It is to be appreciated that the switches 128 and 146 are of the snap-acting type so that when either switch is moved from its outer position it immediately closes at the inner position. Switch 146 thereby completes a circuit from line 126 across switch 125 to line 150, across switch 146 to line 151, thus energizing solenoid 105 which moves valve 109 in the direction to raise the elevator in one continuous motion, this movement being arrested when the elevator piston crosshead moves the plunger of switch 125 from its outer to its inner position. Switches 125 and 131 are also snap-acting switches so that movement from the outer to the inner position will be accomplished instantaneously. When the switch 125 is opened to arrest the upward movement of the elevator a circuit is completed through wire 127, the outer position of switch 128, and wire 129, to bring the stack pusher back to its retracted position. The stack pusher will continue to retract until lug 147 engages switch 128 and moves it to its inner position, whereupon the circuit to the solenoid 103 will be broken and valve 108 will return to neutral. There now being no circuit leading to either of the solenoids for valves 108 and 109, the entire system is in readiness for the building up of a second stack.

It will, of course, be appreciated that in the event boards are being fed to the machine at a rapid rate, a number of superimposed boards may be deposited upon the upper members 91 of the stack pusher frame prior to the complete elevation of the elevator. It is for this reason that the deck is at sufficient height above the stack pusher and the upper elevator control switch 140 to allow a plurality of boards to be deposited thereon. When the stack pusher is retracted and the elevator is at its upper position it is obvious that the switch 140 will be held closed until the partially completed stack has been lowered from engagement therewith in one continuous motion, at which time the elevator will come to a stop and thereafter move downward step by step.

The sequence as so far described will reoccur until a complete package of abutted stacks is deposited upon the support to which the stack pusher moves the individual stacks, each succeeding stack moving the preceding stacks outward step by step.

The switch 140 is mounted on a standard 169 along which it may be vertically adjusted, hence it would seem that various heights of stacks could be created by adjusting the position of switch 140; but, on the contrary, switch 140 must remain within very close limits of a fixed position due to the necessity of having proper relation to the elevator when at its uppermost position in order to start the downward movement of the elevator. It may be adjusted vertically to a limited extent in order to set its proper position with respect to the elevator, but if it is desied to make stacks of considerably less height than those herein illustrated other means must be provided to control the sequence of operation. It would seem relatively simple and a proper solution to provide means for the elevator to move downward step by step a lesser number of steps and thereafter to drop rapidly to the bottom of its movement and thus create a stack of a lesser number of boards. However, this is unsatisfactory since in the delay attendant upon dropping the elevator the remaining distance several other boards could be deposited on the top of the stack, depending upon the speed of operation of the feeder, thus causing the creation of irregular stacks. In order to provide for absolutely uniform creation of small stacks, I provide an intermediate step by step control switch 161 adjustably mounted on standard 160 and which may be moved vertically considerable distances. This switch is brought into operation at its adjusted position by throwing manual switch 134 to its opposite position, making contact with wire 138. Switch 161 thereupon is brought into operation in conjunction with the lower switch 137 which has heretofore been inoperative. Switch 137 is also mounted upon standard 160 and may be adjusted considerably with respect to the bottom of the standard and in its relationship to switch 161. The switches are so connected, as will presently appear, that when switch 134 is in contact with wire 138 step by step control of the elevator will occur as previously described under control of switch 140 until the bottom of the stack moves switch 137 to its inner position, at which time control of the step by step movement of the elevator is shifted from switch 140 to switch 161 which remains depressed until the elevator drops in one continuous movement to clear switch 161. The switches would be arranged in relationship to each other vertically along standard 160 so that the number of boards required to complete a stack at the time the elevator continuously moves downward would be at a minimum so that only a few boards will drop the longer distance between the deck and the top of the stack, thus minimizing the likelihood of disrupting the stack.

Current will flow as before to switch 134, but now a circuit will be completed through wire 139, the outer position of switch 137, and wire 135 leading back to switch 140, so that step by step operation of the elevator under control of the upper switch is accomplished. When the stack has been built up to the extent that the lower board thereof moves switch 137 to its inner position, switch 140 becomes dead and a circuit is completed from wire 138 through switch 137 and wire 170 to switch 161, and wire 171 leading to wire 142, so that step by step control of the elevator will be achieved under control of the intermediate switch 161. The stack of lesser height will be completed in the normal manner until switch 131 causes actuation of the stack pusher arm, thereby causing the stack to be removed from engagement with switch 137 and throwing control of the elevator back to the upper switch 140.

Having described and illustrated a preferred embodiment of my invention, it should be apparent to those skilled in the art that the invention permits of modification in detail and arrangement. I claim as my invention all such modifications as come within the true spirit and scope of the appended claims.

I claim:

1. A lumber stacking machine comprising a frame including a deck having a longitudinal edge, a plurality of pusher members projecting above said deck and normally lying at one side thereof, means to reciprocate said pusher members in unison laterally across said deck whereby a piece of lumber on said deck may be moved laterally therefrom and caused to drop over said edge, one of said pusher members at one end of said deck comprising an extension adapted to underlie said piece of lumber and hold the contiguous portion thereof at the level of the deck while the opposite end falls from said edge, said extension being retracted from said edge when said pusher members are retracted to permit said contiguous portion to drop.

2. A lumber stacking machine comprising a frame including a deck having a longitudinal edge and frame members beneath said deck having their forward surfaces in vertical alignment with said edge, pushing means projecting above said deck and normally lying at one side thereof, means to reciprocate said pushing means laterally across said deck whereby a piece of lumber on said deck may be moved laterally therefrom and caused to drop over said edge, and a plurality of vertical guide members spaced outwardly from said edge to limit lateral travel of the lumber, said pushing means comprising an extension flush with the surface of said deck at one end and adapted to underlie said piece of lumber to hold the contiguous portion thereof at the level of the deck while the opposite end falls alongside of said frame members, said extension being retracted from said edge when said pusher members are retracted to permit said contiguous portion to drop.

3. A lumber stacking machine comprising a frame including a deck having a longitudinal edge and frame members beneath said deck having their forward surfaces in vertical alignment with said edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls alongside of said frame members, said extension being retracted from said edge when said pusher members are retracted to permit said contiguous portion to drop, and mounting means for each of said guide members including a horizontally telescoping support and spring means normally holding said support in telescoped condition, said spring means permitting outward movement of said guide members individually in order to accommodate irregular pieces of lumber.

4. A lumber stacking machine comprising a frame including a deck having a longitudinal edge, pushing means projecting above said deck and normally lying at one side thereof, means to reciprocate said pushing means laterally across said deck whereby a piece of lumber on said deck may be moved laterally therefrom and caused to drop over said edge, a plurality of vertical guide members spaced outwardly from said edge to limit lateral travel of the lumber, said pushing means comprising an extension adapted to underlie one end of said piece of lumber and hold said end at the level of the deck while the opposite end falls, said extension being retracted from said edge when said pushing means is retracted to permit said one end to drop, and mounting means for each of said guide members including a horizontally telescoping support and spring means normally holding said support in telescoped condition, said spring means permitting outward movement of said guide members individually in order to accommodate irregular pieces of lumber.

5. A lumber stacking machine comprising a frame including a deck having a longitudinal edge and frame members beneath said deck having their forward surfaces in vertical alignment with said edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension flush with the surface of said deck to underlie said piece of lumber and hold the contiguous portion thereof at the level of the deck while the opposite end falls alongside of said frame members, said extension being retracted from said edge when said pusher members are retracted to permit said contiguous portion to drop, and means for controlling reciprocation of said pusher members including a switch actuator engageable by a piece of lumber when positioned on said deck.

6. A lumber stacking machine comprising a frame including a deck having a longitudinal edge, a plurality of pusher members projecting above said deck and normally lying at one side thereof, means to reciprocate said pusher members in unison laterally across said deck whereby a piece of lumber on said deck may be moved laterally therefrom and caused to drop over said edge, one of said pusher members at one end of said deck comprising an extension adapted to underlie said piece of lumber and hold the contiguous portion thereof at the level of the deck while the opposite end falls, said extension being retracted from said edge when said pusher members are retracted to permit said contiguous portion to drop, means for controlling reciprocation of said pusher members including a switch actuator engageable by a piece of lumber when positioned on said deck, and a raised ledge mounted on one of said pusher members and movable across said deck therewith to prevent actuation of said switch actuator until said pusher members are fully retracted.

7. A lumber stacking machine comprising a frame including a deck having a longitudinal edge, a plurality of pusher members projecting above said deck and normally lying at one side thereof, means to reciprocate said pusher members in unison laterally across said deck whereby a piece of lumber on said deck may be moved laterally therefrom and caused to drop over said edge, one of said pusher members at one end of said deck comprising an extension underlying said piece of lumber to hold the contiguous portion thereof at the level of the deck while the opposite end falls, said extension being retracted from said edge when said pusher members are retracted to permit said contiguous portion to drop, and a hold-down member mounted in position to engage the upper surface of said contiguous portion of the piece of lumber to prevent it from bouncing off of said extension when said opposite end drops.

8. A lumber stacking machine comprising a frame including a deck having a longitudinal edge and frame members beneath said deck having their forward surfaces in vertical alignment with said edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls alongside of said frame members, said extension being retracted from said edge when said pusher members are retracted to permit said contiguous portion to drop, and a resilient hold-down member mounted on one of said guide members in position to engage the upper surface of said contiguous portion of the piece of lumber to prevent it from bouncing off of said extension when said opposite end drops.

9. A lumber stacking machine comprising a frame including a deck having a longitudinal edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls alongside of said frame members, said extension being retracted from said edge when said pusher members are retracted to permit said contiguous portion to drop, and vertically movable elevator means associated with said frame members and movable to an extreme upper position spaced below said edge, said elevator means being arranged to hold the piece of lumber dropped from said edge in a horizontal position in front of said frame members.

10. A lumber stacking machine comprising a frame including a deck having a longitudinal edge and frame members beneath said deck having their forward surfaces in vertical alignment with said edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls alongside of said frame members, said extension being retracted from said edge when said pusher members are retracted to permit said contiguous portion to drop, vertically movable elevator means associated with said frame members and movable to an extreme upper position spaced below said edge, said elevator means being arranged to hold the piece of lumber dropped from said edge in a horizontal position in front of said frame members, means to move said elevator means downwardly step by step between actuations of said pusher members whereby a stack of lumber may be formed, and means to control said elevator means including an upper elevator switch actuator adapted to be held in operative position by the uppermost piece of lumber on said elevator means until the elevator means moves downwardly an amount commensurate with the thickness of the piece of lumber.

11. A lumber stacking machine comprising a frame including a deck having a longitudinal edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls, said extension being retracted from said edge when said pusher members are retracted to permit said contiguous portion to drop, vertically movable elevator means associated with said frame and movable to an extreme upper position spaced below said edge, said elevator means being arranged to hold the piece of lumber dropped from said edge in a horizontal position in front of said frame, means to move said elevator means downwardly step by step between actuations of said pusher members whereby a stack of lumber may be formed, and stack pusher mechanism movable laterally of said frame to remove a formed stack laterally from said frame, said stack pusher mechanism including a stack pusher switch actuator engageable with the lowermost piece of lumber when said elevator means reaches an extreme lower position.

12. A lumber stacking machine comprising a frame including a deck having a longitudinal edge and frame members beneath said deck having their forward surfaces in vertical alignment with said edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls alongside of said frame members, said extension being retracted from said edge when said pusher members are retracted to permit said contiguous portion to drop, vertically movable elevator means associated with said frame members and movable to an extreme upper position spaced below said edge, said elevator means being arranged to hold the piece of lumber dropped from said edge in a horizontal position in front of said frame members, means to move said elevator means downwardly step by step between actuations of said pusher members whereby a stack of lumber may be formed, stack pusher mechanism movable laterally of said frame to remove a formed stack from proximity to said frame members comprising a plurality of horizontal members lying slightly below said extreme upper position of said elevator means and temporarily receiving pieces of lumber of a succeeding stack while said elevator means is lowered, and means to return said elevator means to said extreme upper position including an elevator means return switch actuator operated by said stack pusher mechanism when fully extended.

13. A lumber stacking machine comprising a frame including a deck having a longitudinal edge, pushing means normally lying at one side of said deck, means to reciprocate said pushing means laterally across said deck whereby a piece of lumber on said deck may be moved laterally therefrom and caused to drop over said edge, vertically movable elevator means associated with said frame and movable to an extreme upper position spaced below said edge, said elevator means being arranged to hold the piece of lumber dropped from said edge in a horizontal position in front of said frame, means to move said elevator means downwardly step by step between actuations of said pushing means whereby a stack of lumber may be formed, stack pusher mechanism movable laterally of said frame to remove a formed stack from proximity to said frame comprising a plurality of horizontal members lying slightly below said extreme upper position of said elevator means and temporarily receiving pieces of lumber of a succeeding stack while said elevating means is lowered, and means operable by said elevator means to prevent retraction of said stack pusher mechanism until said elevator means is raised to said extreme upper position.

14. A lumber stacking machine comprising a frame including a deck having a longitudinal edge, a plurality of pusher members normally lying at one side of said deck, means to reciprocate said pusher members in unison laterally across said deck whereby a piece of lumber on said deck may be moved laterally therefrom and caused to drop over said edge, vertically movable elevator means associated with said frame and movable to an extreme upper position spaced below said edge, said elevator means being arranged to hold the piece of lumber dropped from said edge in a horizontal position in front of said frame, means to move said elevator means downwardly step by step between actuations of said pusher members whereby a stack of lumber may be formed, stack pusher mechanism movable laterally of said frame to remove a formed stack laterally from said frame, said stack pusher mechanism including a stack pusher switch actuator engageable with the lowermost piece of lumber when said elevator means reaches an extreme lower position, and manually selectable means for causing said elevator means to move downward in one continuous motion after reaching an intermediate position in the step-by-step manner comprising an intermediate elevator means switch actuator adapted to be moved to operating position by the lowermost piece of lumber on said elevator means when said elevator means reaches said intermediate position.

15. A lumber stacking machine comprising a frame including a deck having a longitudinal edge, pushing means projecting above said deck and normally lying at one side thereof, means to reciprocate said pushing means laterally across said deck whereby a piece of lumber on said deck may be moved laterally therefrom and caused to drop over said edge, vertically movable elevator means associated with said frame and movable to an extreme upper position spaced below said edge, said elevator means being arranged to hold the piece of lumber dropped from said edge in a horizontal position in front of said frame, means to move said elevator means downwardly step by step between actuations of said pushing means whereby a stack of lumber may be formed, stack pusher mechanism movable laterally of said frame to remove a formed stack laterally from said frame, said stack pusher mechanism including a stack pusher switch actuator engageable with the lowermost piece of lumber when said elevator means reaches an extreme lower position, manually selectable means for causing said elevator means to move downward in one continuous motion after reaching an intermediate position in the step-by-step manner comprising an intermediate elevator means switch actuator adapted to be moved to operating position by the lowermost piece of lumber on said elevator means when said elevator means reaches said intermediate position, and supporting means for said intermediate elevator means switch actuator including a vertical post along which said intermediate elevator means switch actuator may be vertically adjusted whereby stacks of variable height may be formed.

16. A lumber stacking machine comprising a frame including a deck having a longitudinal edge and frame members beneath said deck having their forward surfaces in vertical alignment with said edge, a plurality of pusher members projecting above said deck and normally lying at one side thereof, means to reciprocate said pusher members in unison laterally across said deck whereby a piece of lumber on said deck may be moved laterally therefrom and caused to drop over said edge, a plurality of vertical guide members spaced outwardly from said edge to limit lateral travel of the lumber, one of said pusher members at one end of said deck comprising an extension adapted to underlie said piece of lumber and hold the contiguous portion thereof at the level of the deck while the opposite end falls alongside of said frame members, said extension being retracted from said edge when said pusher members are retracted to permit said contiguous portion to drop, vertically movable elevator means associated with said frame members and movable to an extreme upper position spaced below said edge, said elevator means being arranged to hold the piece of lumber dropped from said edge in a horizontal position in front of said frame members, means to move said elevator means downwardly step by step between actuations of said pusher members whereby a stack of lumber may be formed, stack pusher mechanism movable laterally of said frame to remove a formed stack laterally from said frame members, said stack pusher mechanism including a stack pusher switch actuator engageable with the lowermost piece of lumber when said elevator means reaches an extreme lower position, and a horizontal support onto which stacks are moved by said stack pushing mechanism, said support being of a width capable of receiving a plurality of abutted stacks whereby packages of lumber may be formed.

HERBERT E. HESSLER.

REFERENCES CITED

The following references are of record in the file of this patent:

UNITED STATES PATENTS

| Number | Name | Date |
|---|---|---|
| 983,891 | Graham | Feb. 14, 1911 |
| 1,490,594 | De Lateur | Apr. 15, 1924 |
| 2,228,887 | Peterson | Jan. 14, 1941 |
| 2,517,675 | Keller | Aug. 8, 1950 |